Patented July 30, 1940

2,209,850

UNITED STATES PATENT OFFICE 2,209,850

FIBROUS GLASS TEXTILE MATERIAL FOR ELECTRICAL INSULATION

Errol B. Shand and James Franklin Hyde, Corning, N. Y., assignors, by mesne assignments, to Owens-Corning Fiberglas Corporation, a corporation of Delaware No Drawing. Application January 21, 1938, Serial No. 186,244

13 Claims. (Cl. 154—2.6)

This invention relates to the manufacture of artificial textile materials, such as glass fibres, and more particularly to the treatment of such materials with insulating and impregnating compounds for use as electrical insulation.

It has been found by the electrical industry that the dielectric properties of most fibrous materials assembled in textile form may be materially improved by coating or impregnating such textiles with liquid or plastic substances likewise having good dielectric properties. Such coatings and impregnants not only fill the interstices between individual fibres and separate threads but coat the individual fibres, tending to prevent the absorption of moisture therein and in general improving the mechanical properties of the insulation.

The recent perfection of processes for the spinning and weaving of textile products from fine filaments of glass has made available to the art an entirely new insulating material. While glass has a high inherent dielectric strength it has been found that fibrous glass is subject to the same evils of break down and leakage thru surface moisture as other fibrous insulations. In order to more fully take advantage of the dielectric strength of the glass it has been found desirable to impregnate the fibrous glass materials with plastic or fluid insulating substances.

In the impregnation of other fibrous insulating materials it has been found that great care must be taken to completely fill all voids in the body of fibres and even in the fibres themselves since such voids and capillary paths in the final body of insulation tend to absorb moisture from humid atmospheres or any other available source and thus materially reduce the dielectric value of the insulation as a whole. While glass fibres do not contain the capillary passages common to many natural fibres and cannot of themselves absorb any moisture they have the inherent disadvantage of an absolutely smooth exterior surface to which the impregnating substances must bond if a moisture impervious body of insulation is to result. For this reason it has been found necessary to take special precautions and develop special methods of impregnation to insure a perfect tenacious bond between the glass fibres and the impregnant composition.

Since glass fibres are completely impervious to all liquids, there can be no softening of the material in any coating bath and no absorption of fluid by the fibres themselves to aid in distributing the material thru the fibres and securing its adhesion thereto. Since this problem is fundamental to the coating of glass fibres with any material, it is the object of this invention broadly to secure uniform distribution of sizing substances, impregnants and other treating materials thruout a body of glass fibres and to obtain a permanent and tenacious bond between these materials.

More particularly it is the object of this invention to prepare glass fibres during their manufacture and assembly for the subsequent reception and adhesion of coating substances, particularly dielectric materials so as to produce electrical insulation having uniform electrical characteristics which will remain substantially constant under all conditions.

It has been found that the desired results can be obtained by coating each filament with a thin layer of material which will adhere tenaciously to the glass. This coating tends to protect the individual fibres from their mutual abrasive action and, if properly chosen, will provide a surface to which or with which the subsequent impregnating and coating materials will readily bond.

In the manufacture of textile materials it has become standard practice to treat various fibres with lubricants which facilitate preparation of the fibres and production of the thread. Once the yarn or thread has been spun, it is often given a sizing treatment in which a coating is developed on the surface of the thread. This coating forms a smooth hard surface on the thread and is useful in increasing the strength and ease of manipulation of the thread and materially reduces the amount of lint and fly in subsequent operations.

These processes are found to be of similar value in the manipulation of fibrous glass textiles but if transferred bodily from the prior textile art are found to render the glass textile unsuitable for electrical purposes. For example, lubricants are often applied in the form of aqueous emulsion which may have as a constituent a deliquescent salt. Such a lubricant when present on glass fibre may lower the electrical resistance of the material to one one-hundredth of its resistance when this material is absent. Similarly gelatines, starches and glues are among the most common of textile sizing agents but these substances tend to pick up moisture and, if present in electrical insulation, materially reduce the dielectric strength of the material.

In order to obtain the maximum dielectric strength from the material, it has been found necessary to completely eliminate moisture from the material and the presence of voids therein in which moisture might collect. This necessitates satisfactory penetration of the coating material and complete coverage of each individual fibre. It has been found that this can be accomplished only by the use of a very low viscosity solution of low surface tension which will wet each individual filament and readily form a thin film thereon. Not only does the low viscosity and surface tension aid in securing penetration of the treating fluid to all filaments but it also tends to limit the thickness of the film and in turn cut down the time necessary to secure drying of the coating.

Most important of all, it has been found that the initial coating or sizing of the filaments must be of such a nature that the subsequent impregnating material will make an effective bond therewith. This may be effected by sizing with a material which will form a coating to which the impregnant will adhere tenaciously or with which it will be miscible at the temperature at which the impregnant is applied.

It has been found possible to use a very considerable number of substances in the manner recited above. For instance, if the material is intended to be impregnated with a phenolic condensation product the individual filaments may be first coated with a dilute aqueous solution of the same material in the first stages of its reaction or with an acetone or other solution of the material in a more completely polymerized condition. Similarly certain vegetable and synthetic drying oils, oil-resin varnishes and synthetic resin solutions may be used as the initial coating so long as they adhere tightly to the fibres and make an effective bond with the impregnant. Similarly these other substances, the glycerol resins, vinyl resins, the methacrylates, the chlorinated naphthalenes and certain natural resins may be used alone or in combination as impregnants where corresponding or compatible substances have been used for the initial sizing or coating.

In the same manner, if the subsequent impregnant is to be a hydrocarbon, either an oil or wax or asphaltic gum, it is desirable to use as an initial coating substance a wax or oil which will be thoroughly miscible with the hydrocarbon impregnant and will be free from all salts and similar substances which would detract from its dielectric strength.

While the above treatments have been generally referred to as applied to a textile material the initial coating may take place at a variety of stages in the fabrication of the material. For instance, when the primary coating material is of an oily nature, it may be desirable to spray the material onto the individual fibres at their formation in which case it acts as a lubricant during subsequent processing operations. In such instances it may prove desirable to subject the yarn, felted sheet or other product to heat treatment at an intermediate stage to set up the coating material and cause it to act as a sizing material rather than as a mere lubricant. This may readily be done with the drying oils and synthetic resins which polymerize in the presence of heat. On the other hand, it is often desirable to fabricate the filaments into cloth or tape before giving them their initial coating, in which case the textile may well be dipped in a dilute solution of the coating material and subsequently passed thru a drying oven. This material may then be subjected to further fabricating operations such as weaving or assembly in electrical equipment before being given the final impregnation.

While frequent use has been made of the term "textile material" or "textile product" in the specification and claims these terms are not used in a limited sense, but are intended to cover all woven, knitted, felted, braided and wrapped bodies of fibres which it is desired to coat or impregnate. It is realized that only a portion of the available sizing and impregnating substances have been specifically recited above, but it is believed that they are sufficient to teach the principles involved in the invention. It is to be understood that these substances have been named by way of illustration and that the invention is to be limited solely by the scope of the appended claims.

We claim:

1. A method of forming dielectric material which comprises coating a plurality of textile fibres with an insulating substance, fabricating said fibres into a fibrous body and impregnating said body with a congruous insulating substance.

2. A method of forming dielectric material which comprises coating a plurality of textile fibres with an insulating substance, fabricating said fibres into cloth, and impregnating said cloth with a congruous insulating substance.

3. A method of forming dielectric material which comprises coating each of a plurality of glass filaments with a resinous substance, fabricating said fibres into a textile material, and impregnating said material with a resinous substance.

4. A method of forming dielectric material which comprises coating each of a plurality of glass filaments with a substance having a hydrocarbon base, fabricating said fibres into a textile material, and impregnating said material with an impregnant having a hydrocarbon base.

5. The method of forming dielectric material comprising the steps of assembling a plurality of glass filaments into a textile product, coating each of said filaments with a thin tenacious layer of insulating material, and subsequently impregnating said product with an insulating material which will bond effectually to said coating.

6. The method of forming dielectric material comprising the steps of assembling a plurality of glass filaments into a textile product, coating each of said filaments with a thin tenacious layer of insulating material, and subsequently impregnating said product with an insulating material which will be miscible with said coating.

7. The method of forming dielectric material comprising the steps of assembling a plurality of glass filaments into a textile product, coating each of said filaments with a thin tenacious layer of insulating material, and subsequently impregnating said product with an insulating material which will be congruous with said coating.

8. The method of forming dielectric material comprising forming a body of textile fibres, coating said fibres with a lubricant to facilitate their fabrication, fabricating said fibres into a textile material, and heat treating said material to solidify said lubricant as a film of dielectric material on the individual fibres.

9. The method of forming dielectric material comprising forming a body of textile fibres, coating said fibres with a lubricant to facilitate their fabrication, fabricating said fibres into a textile material, and heat treating said material to solidify said lubricant as a film of dielectric material on the individual fibres and subsequently impregnating with a dielectric substance which will bond effectually therewith.

10. The method of forming a dielectric material comprising coating a plurality of glass filaments with a primary reaction product of phenol and formaldehyde, spinning said fibres into a yarn, heat treating said yarn to polymerize the reaction product thereon, and weaving said yarn into an electrical insulating tape.

11. The method of forming a dielectric material comprising coating a plurality of glass filaments with a primary reaction product of phenol and formaldehyde, spinning said fibres into a yarn, heat treating said yarn to polymerize the reaction product thereon, and weaving said yarn into an electrical insulating tape and subsequently impregnating said tape with a phenol formaldehyde condensation product.

12. The method of forming dielectric material which comprises forming a plurality of fine filaments of glass, coating each of said filaments immediately after its formation with a thin film of lubricating material, fabricating said fibres into a textile material and subsequently impregnating said material with a dielectric substance which will bond tightly to said lubricating material.

13. The method of forming dielectric material which comprises forming a plurality of fine filaments of glass, coating each of said filaments immediately after its formation with a thin film of lubricant, fabricating said fibres into a textile material, treating said material to render said film tightly adherent to said fibres and subsequently impregnating said textile with a material which will bond tightly to said treated lubricant.

ERROL B. SHAND.
JAMES FRANKLIN HYDE.